(12) United States Patent
Bowman et al.

(10) Patent No.: US 6,520,277 B1
(45) Date of Patent: Feb. 18, 2003

(54) TRACTOR STEERING CYLINDER WITH INTERNAL ADJUSTABLE STEERING STOPS

(75) Inventors: Dennis Aaron Bowman, Cedar Falls, IA (US); James Albert Niebergall, Buckingham, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/661,832

(22) Filed: Sep. 14, 2000

(51) Int. Cl.$^7$ .................................................. B62D 5/00
(52) U.S. Cl. ........................................ 180/403; 92/13.5
(58) Field of Search ................................ 180/403, 400; 92/13, 13.5, 13.6

(56) References Cited

U.S. PATENT DOCUMENTS

| | | | |
|---|---|---|---|
| 1,879,763 A | | 9/1932 | Overton |
| 3,031,853 A | | 5/1962 | Olson |
| 3,130,646 A | * | 4/1964 | Pennington .................... 92/13 |
| 3,138,073 A | * | 6/1964 | Whitehouse ................... 92/13 |
| 3,148,595 A | | 9/1964 | Looney |
| 3,543,643 A | | 12/1970 | Stroud |
| 3,973,472 A | | 8/1976 | Russell, Jr. |
| 4,043,124 A | * | 8/1977 | Weisgerber ................. 180/403 |
| 4,166,716 A | | 9/1979 | DeSantis |
| 4,592,440 A | * | 6/1986 | Ujita et al. .................. 180/435 |
| 4,970,943 A | * | 11/1990 | Salg et al. ................... 180/400 |
| 4,984,508 A | * | 1/1991 | Muller ........................ 92/13.5 |
| 5,477,772 A | | 12/1995 | Weyer |
| 5,489,006 A | * | 2/1996 | Saiia et al. ................. 180/423 |
| 5,697,677 A | * | 12/1997 | Ruppert, Jr. et al. ..... 301/124.1 |
| 6,039,143 A | * | 3/2000 | Kielar et al. ............... 180/412 |

FOREIGN PATENT DOCUMENTS

GB  2 167 023  5/1986

OTHER PUBLICATIONS

John Deere, 6000 Ten Series Tractors 65 to 95 hp, pp. 1–4, date of publication Aug. 1999, published in U.S.A.

* cited by examiner

Primary Examiner—Daniel G. DePumpo

(57) ABSTRACT

A steering cylinder for a tractor with internal, adjustable steering stops that do not occupy packaging space beyond the cylinder itself. End caps of the cylinder, between the piston rod and the cylinder, serve as the stops. The end caps are threadably mounted in the cylinder to enable adjustment. The stops can be rotated relative to the cylinder to thread the stops in or out, thereby changing the stroke of the steering cylinder. Once the stops are set to the desired location, they are held in place by a retainer that is bolted to the cylinder. The retainers can be selectively removed from the cylinder and then used as a wrench to rotate the stops to adjust the cylinder stroke. Adjustment is needed when different wheel and tire combinations are mounted on the tractor or when the tread width is changed. A travel limiter is mounted to the cylinder to prevent complete withdrawal of the stops and the resulting loss of hydraulic oil.

7 Claims, 3 Drawing Sheets

TRACTOR STEERING CYLINDER WITH INTERNAL ADJUSTABLE STEERING STOPS

BACKGROUND OF THE INVENTION

1. Field of the Invention

The present invention relates to a tractor such as an agricultural tractor having a steering cylinder for turning the front tires with adjustable steering stops built into the cylinder for controlling the length of stroke of the steering cylinder.

2. Description of Related Art

It is known to equip an agricultural tractor with a hydraulic front steering cylinder that is a double acting cylinder having a piston rod extending in both directions from the cylinder. The rod is coupled to left and right steering knuckles of the tractor by tie rods to turn the front wheels. The extent to which the front wheels can be turned is often controlled by steering stops formed on the steering knuckle and the axle housing. The steering stops may include a boss on the axle and a threaded fastener on the steering knuckle. The fastener head contacts the boss to limit rotation of the knuckle to prevent further turning. The threaded fastener can be turned in or out to adjust the extent of steering travel for different wheel and tire combinations. With the increasing popularity of front suspension axles for agricultural tractors, there is greater competition for space between the tractor chassis and the steering knuckles, making it more difficult to package steering stops at the steering knuckle.

SUMMARY OF THE INVENTION

Accordingly, it is an object of the present invention to provide a steering stop that does not interfere with suspension components to thereby provide greater flexibility to the suspension designer for locating the suspension components.

According to the present invention, the steering stops are provided internal to the steering cylinder and thus do not occupy additional packaging space beyond the cylinder itself. The steering cylinder of the present invention has a piston rod extending through and beyond both ends of the cylinder. A piston carried by the rod between the rod and the cylinder transfers the hydraulic force into linear motion of the rod. The rod extends through end caps at each end of the cylinder. The end caps are each threadably mounted to the cylinder and serve as the steering stops. When the piston travels to the point where the piston contacts the stops, travel of the piston is stopped. The stops can be rotated relative to the cylinder to thread the stops in or out, thereby changing the stroke of the steering cylinder.

Once the stops are set to the desired location, they are locked in place by a retainer that is bolted to the cylinder. The retainers can be selectively removed from the cylinder and then used as a wrench to rotate the stops to adjust the cylinder stroke. Adjustment is needed when different wheel and tire combinations are mounted on the tractor or when the tread width is changed. A travel limiter is mounted to the cylinder to prevent complete withdrawal of the stops and the resulting loss of hydraulic oil.

DESCRIPTION OF THE PREFERRED EMBODIMENT

Figure 1:
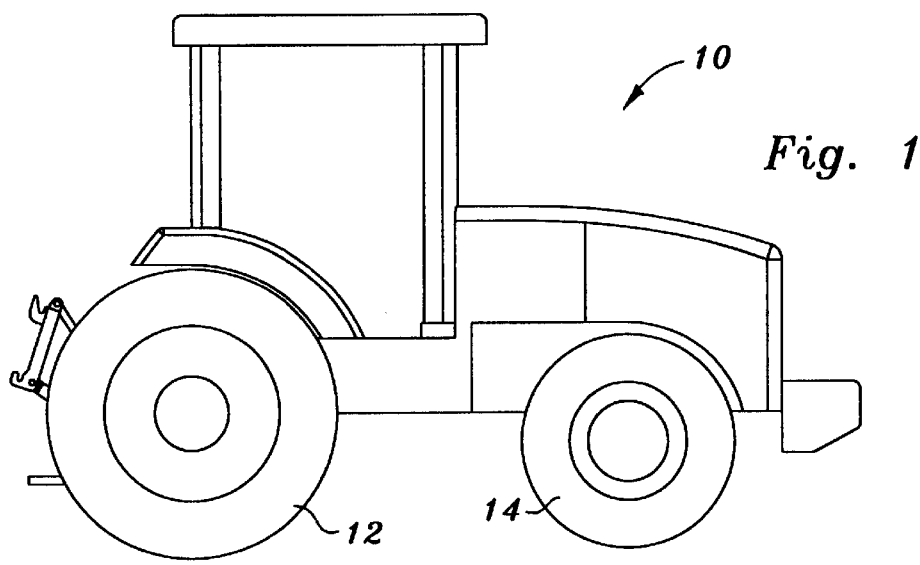
FIG. 1 is a side view of an agricultural tractor having the steering cylinder of the present invention.

With reference to FIG. 1, a tractor 10 having the steering cylinder of the present invention is shown. The tractor 10 includes rear wheels 12 and front wheels 14. The front wheels 14 are steering wheels and rotate about an upright, though not necessarily vertical, axis to steer the vehicle. Rotation of the wheels 14 about the, upright axis is provided through a rotating steering knuckle at each end of the front axle in a conventional manner for a vehicle.

Figure 2:
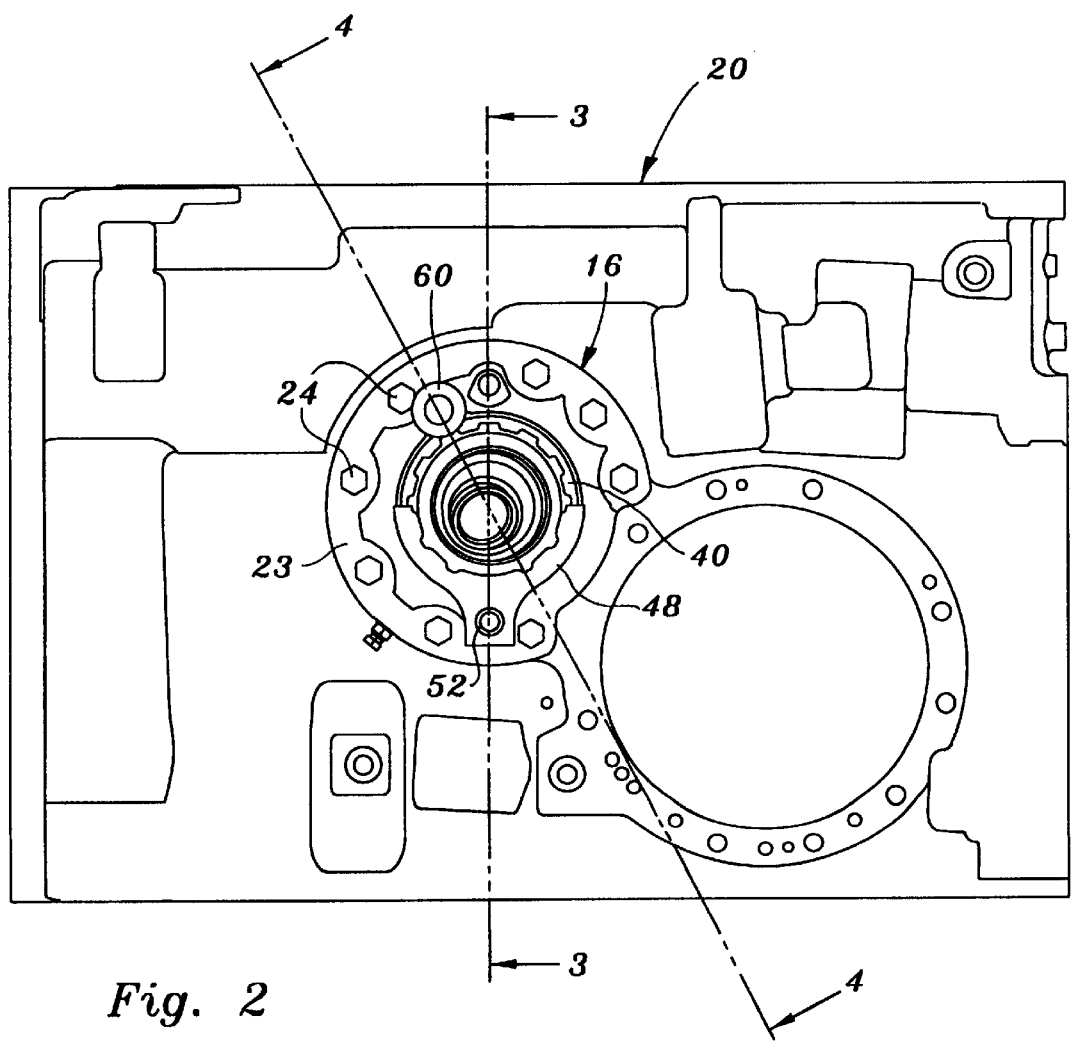
FIG. 2 is a side elevational view of the front wheel drive differential case and steering cylinder.
Figure 3:
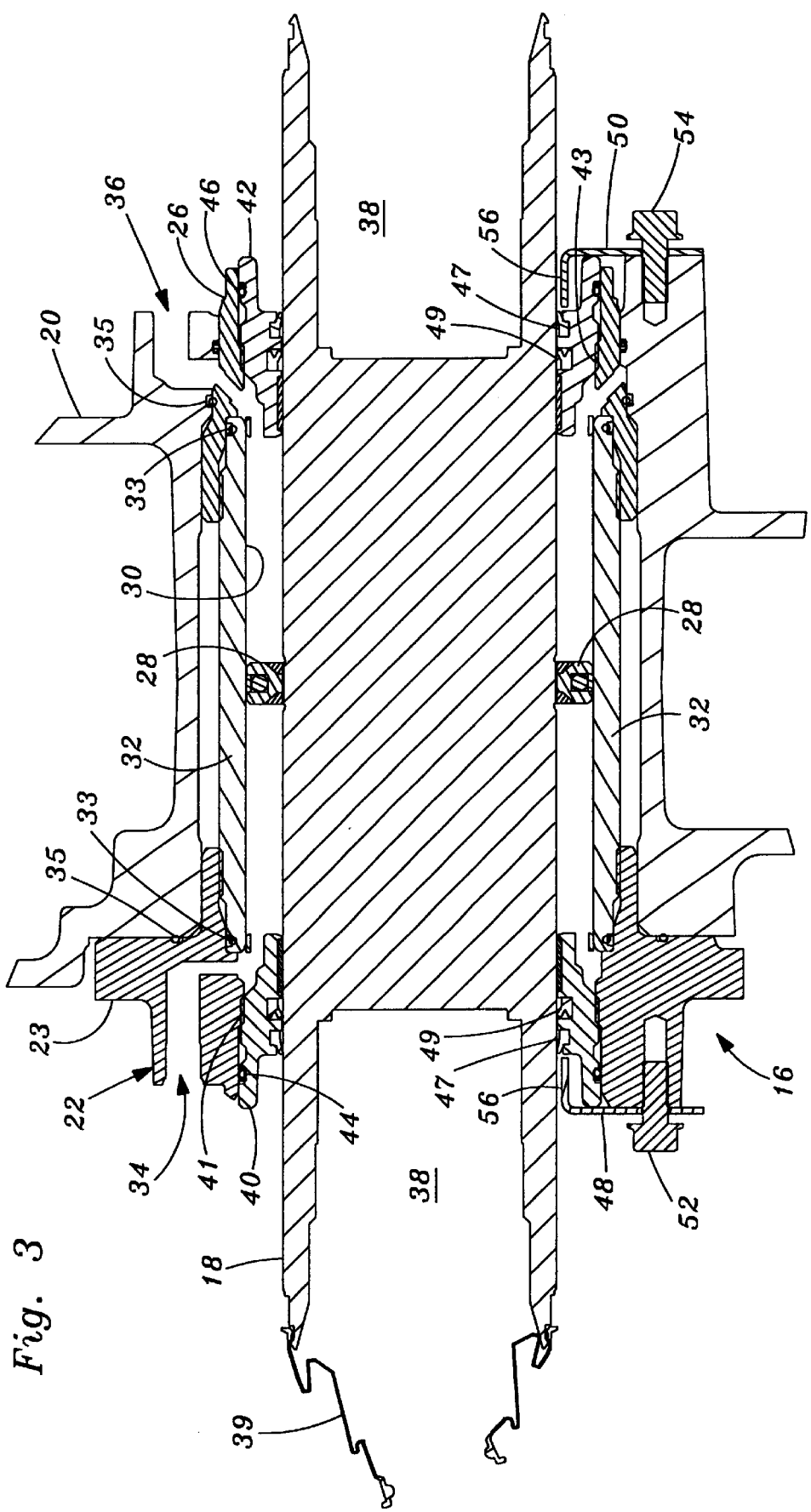
FIG. 3 is an enlarged sectional view of the steering cylinder and differential case as seen from substantially the line 3—3 of FIG. 2
Figure 4:
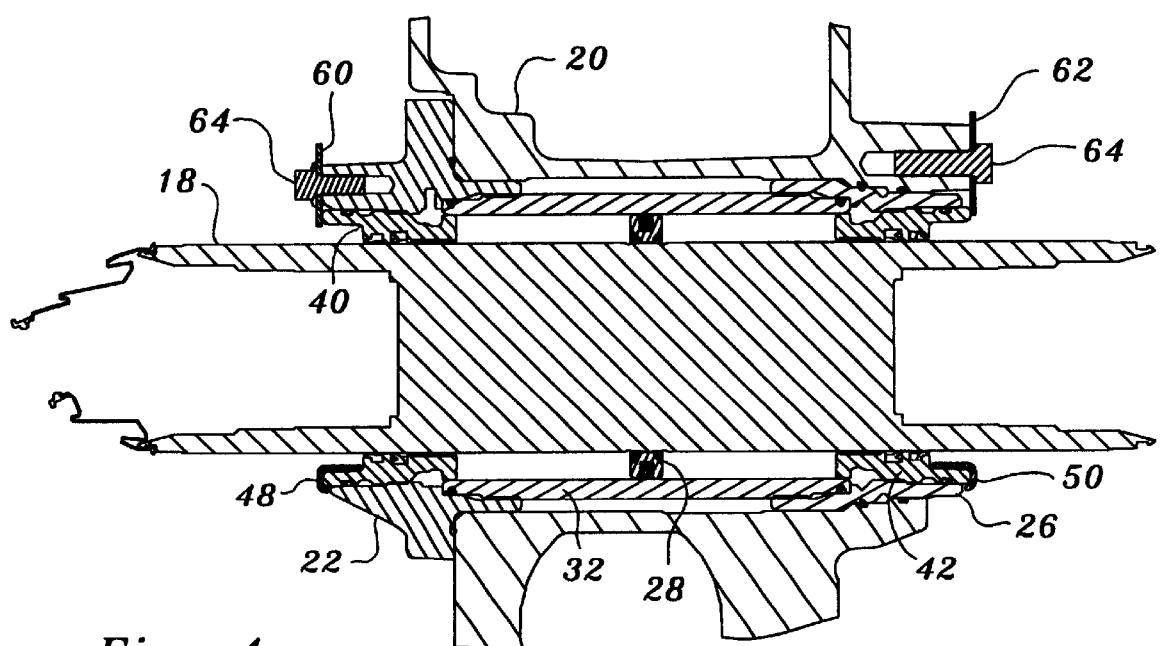
FIG. 4 is a sectional view of the steering cylinder and front differential case as seen from substantially the line 4—4 of FIG. 2.

A steering cylinder 16 shown in FIGS. 2–4 is connected to each steering knuckle through left and right tie rods, not shown, also in a known manner. The cylinder 16 includes a piston rod 18 extending through the cylinder and beyond the opposite ends of the cylinder. In the embodiment shown, the cylinder 16 is mounted to a front drive differential case 20 that also houses the front drive components for the mechanical front wheel drive. While shown in this context, the steering cylinder with adjustable stops according to the present invention can be incorporated into other steering cylinders that are not mounted to a front drive differential or are not used with a mechanical front wheel drive. The cylinder includes a cylinder cap 22 having a flange 23 bolted to the differential case 20 by a plurality of bolts 24.

The cylinder cap 22 forms the left end of the cylinder while a cylinder cap 26 forms the right end of the cylinder. A sleeve 32 extends between the cylinder caps 22, 26. The cylinder caps and sleeve form the cylinder 16. O-rings 33 form seals between the cylinder caps and the sleeve 32 while O-rings 35 form seals between the cylinder caps and the differential case 20.

The piston rod 18 carries a piston 28 that extends radially from rod to the inner surface 30 of the sleeve 32. Oil passage 34 through the cylinder cap 22 and oil passage 36 through the differential case 20 and cylinder cap 26 allow oil to enter and leave the cylinder on each side of the piston. The oil pressure moves the piston to the left or to the right to turn the front wheels 14. The tie rods (not shown) are connected to the piston rod 18 in the sockets 38 formed in the two ends of the rod 18. The right hand end of the piston rod is shown with a boot 39 covering the socket 38. A similar boot is mounted to the left-hand end of the piston rod as well.

Piston travel to the right and left is limited by end caps 40, 42 that form stops for the piston travel. The piston travel is stopped when the piston makes contact with either of the stops 40 or 42. The stop 40 is threadably mounted to the cylinder cap 22 by thread 41 while the stop 42 is threadably mounted to the cylinder cap 26 by thread 43. O-ring seals 44 and 46 are provided between the respective stops and cylinder caps. Seals 47 and 49 are provided between the end caps and the rod 18. The threads enable the stops 40 and 42 to move in and out relative to the cylinder caps by rotation of the stops. Thus, the position of the stops can be changed to change the length of the stroke of the piston 28.

Figure 5:
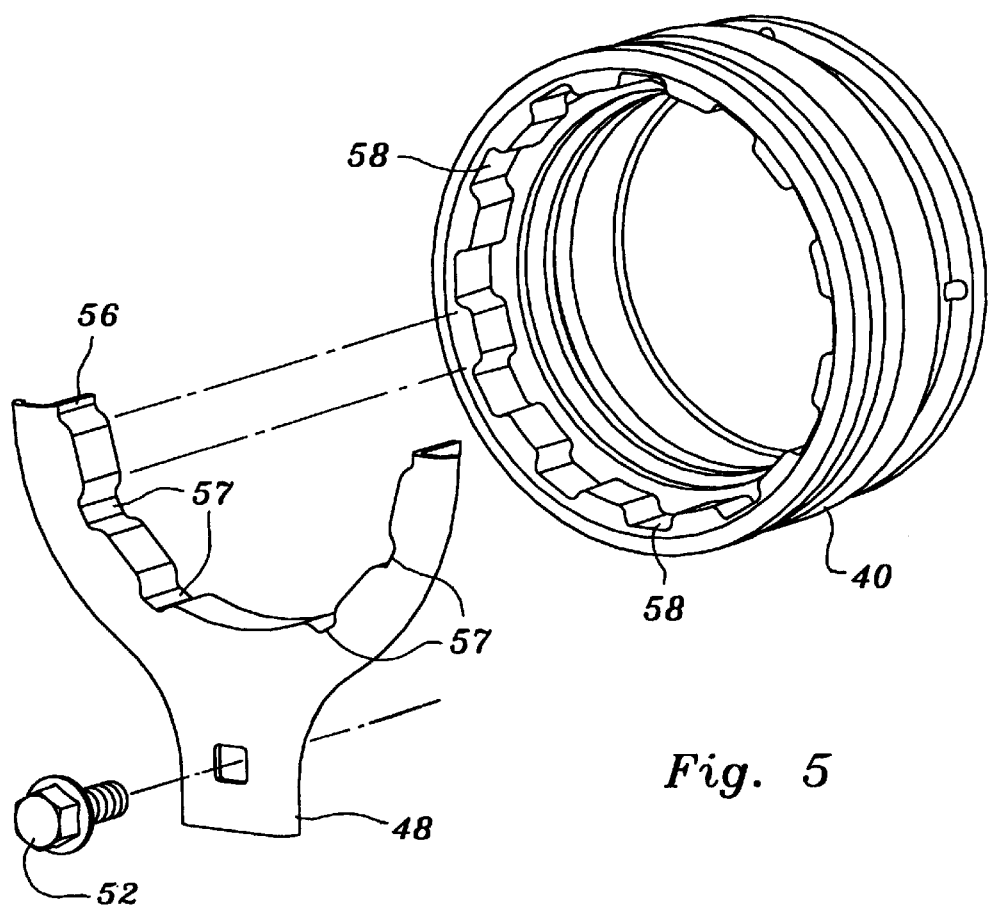
FIG. 5 is an exploded enlarged perspective view of the steering stop and retainer.

Stops 40 and 42 are held in place by a retainers 48, 50 respectively. The retainer 48 is secured to the cylinder cap 22 by a bolt 52 while the retainer 50 is secured to the differential case 20 by a bolt 54. The retainers as shown in FIG. 2 are crescent shaped and extend around half of the stops. As shown in FIG. 5 the retainers have an axially inwardly extending flange portion 56. The flange portions 56 are contoured with outwardly extending ridges 57 that seat into grooves 58 in the stops 40 and 42 to hold the stops against rotation. When it is necessary to rotate the stops 40, 42, the bolts 52, 54 are removed and the retainers 48, 50 are used as wrenches to rotate the stops 40, 42. Afterwhich, the bolts 52, 54 are again bolted to the cylinder to hold the stops in place as described above.

To avoid inadvertent excessive withdrawal of the stops 40, 42, travel limiters 60, 62 are mounted to the cylinder cap 22 and the differential case 20 respectively. The travel limiters 60, 62 are washers and are secured by bolts 64. The travel limiters prevent inadvertent withdrawal of the stops 40, 42 and the subsequent loss of hydraulic fluid from the steering cylinder.

The stops 40, 42 do not utilize any space outside of the physical volume of the steering cylinder, thus freeing space along the front axle for suspension and front drive components. In addition, the stops maintain the ability to adjust the steering cylinder stroke length.

The invention should not be limited to the above-described embodiment, but should be limited solely by the claims that follow.

We claim:

1. In a tractor having a hydraulic steering system including a cylinder with opposite ends, a piston rod extending through the cylinder and beyond both ends, a piston carried on the rod between the rod and the cylinder and end caps mounted in the cylinder at the ends thereof and extending radially between the piston rod and the cylinder to close the ends of the cylinder and against which the piston abuts to limit travel of the rod, the end caps having bores through which the rod extends, the improvement comprising: threadably mounting the end caps in the cylinder to enable the axial positions of the end caps in the cylinder to be adjusted in their entirety by rotation of the end caps; the end caps having a plurality of grooves therein; and, a retainer removably mounted at each end of the cylinder, each retainer being adapted to engage an end cap to fix the end cap from rotation to hold the end cap axially in place the retainers have an axially inwardly extending flange portions, the flange portions being contoured with outwardly extending ridges that seat into the grooves in the end caps to hold the end caps against rotation.

2. The tractor as defined by claim 1 wherein the end caps are accessible from the exterior of the cylinder to turn the end caps.

3. The tractor as defined by claim 1 wherein the end caps are sealed to the piston rod and the cylinder.

4. The tractor as defined by claim 1 wherein the retainers are bolted to the cylinder.

5. The tractor as defined by claim 1 further comprising travel limiters to prevent the end caps from being completely removed from the cylinder.

6. The tractor as defined by claim 5 wherein travel limiters are selectively removable.

7. The tractor as defined by claim 1 wherein the cylinder is integrated into a mechanical front wheel drive differential housing.

\* \* \* \* \*